(No Model.)

J. E. WELLING.
WATER COOLER.

No. 291,857. Patented Jan. 8, 1884.

WITNESSES:
Fred. G. Dieterich.
Arthur L. Morsell.

John E. Welling
INVENTOR.
By Louis Bagger & Co.
ATTORNEYS.

UNITED STATES PATENT OFFICE.

JOHN EDWARD WELLING, OF GEORGETOWN, KENTUCKY, ASSIGNOR OF ONE-HALF TO JUSTICE WEBB, OF SAME PLACE.

WATER-COOLER.

SPECIFICATION forming part of Letters Patent No. 291,857, dated January 8, 1884.

Application filed October 31, 1883. (No model.)

*To all whom it may concern:*

Be it known that I, JOHN E. WELLING, a citizen of the United States, and a resident of Georgetown, in the county of Scott and State of Kentucky, have invented certain new and useful Improvements in Water-Coolers; and I do hereby declare that the following is a full, clear, and exact description of the invention, which will enable others skilled in the art to which it appertains to make and use the same, reference being had to the accompanying drawings, which form a part of this specification, and in which—

Figure 1:
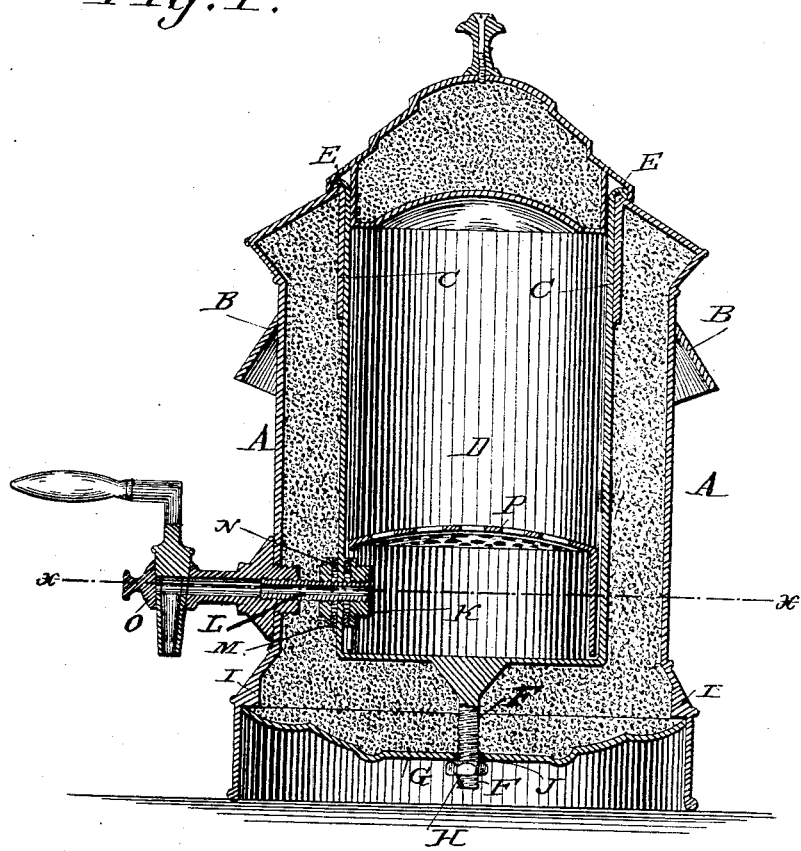
Figure 2:
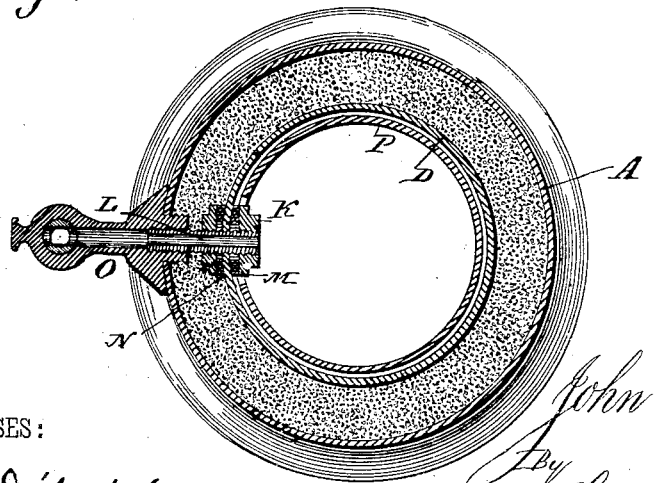

Figure 1 is a vertical sectional view of my improved water-cooler, and Fig. 2 is a cross-section through the line $x$ $x$ in Fig. 1.

Similar letters of reference indicate corresponding parts in both the figures.

My invention has relation to water-coolers; and it consists in the improved construction and combination of parts of the same, which will be hereinafter more fully described, and particularly pointed out in the claims.

My improved water-cooler consists of an outer shell or casing, A, of any desired material and shape, but preferably of cylindrical form, provided with handles B and an inside flange, C, at the top. Into this shell is inserted the water and ice receptacle D, which I prefer to make of galvanized iron, zinc, or iron lined with porcelain enamel, to prevent oxidation. The upper rim of this inside tank or receptacle, D, is turned down to fit over the top of flange C, as shown at E, and its bottom is provided with a downward-projecting screw, F. G is the bottom of the casing A, which is removable, and held in place by a nut, H, screwed upon the screw F, which is inserted through a central aperture, J, in the removable bottom plate, G. The lower part of the shell or casing A is enlarged, and provided with an inside shoulder, I, which forms a bearing for the rim of the removable bottom plate, G. Thus it will be seen that the sawdust, rice-hulls, or other filling may be readily renewed whenever desired by simply removing the bottom G, when the old filling can be shaken out and new filling put in to take its place. After the shell has been packed with the filling around the inside chamber or receptacle, D, the filling is prevented from coming out by the bottom plate, G, being screwed up tight against the inside shoulder, I, by means of the nut H.

If desired, the inside water tank or receptacle, D, may be removed by unscrewing the perforated nut K, which fastens the inner end of the faucet-tube L to the inside of tank D. In order to make a water-tight joint between this tube L and tank D, I employ one or more thin washers, M, made of lead or other suitable material, adapted to conform to the inside shape of tank D, against which they are screwed up by the nut K. Similar washers are placed on the outside of the tank, as shown at N, the outer end of tube L being screwed into the faucet O, which is fixed permanently in the shell or casing A.

In order to prevent the ice from melting too rapidly, I employ a removable ice-bridge, P, through the perforated top of which the ice-water drains down into the bottom of the tank, where it may be drawn off, as required, through the faucet L O.

From the foregoing description, taken in connection with the drawings, it will be seen that not only can the inside filling or packing readily be renewed whenever required, but the inside water-tank or receptacle, D, may also readily be renewed when worn out, so that the outside shell or casing, A, may be made, if desired, of silver or other expensive material, inasmuch as it will suffer no injury by the renewal either of the filling or of the inside water-tank.

Having thus described my invention, I claim and desire to secure by Letters Patent of the United States—

1. In a water-cooler, the combination of the outer shell or casing, A, having the downwardly-projecting inside flange, C, and annular shoulder I near its bottom, removable water-tank D, having flange E and central bottom screw, F, removable bottom G, having the central aperture, J, and nut H, constructed and combined substantially as and for the purpose shown and set forth.

2. In a water-cooler, the combination of the outer shell or casing, A, having the downwardly-projecting inside flange, C, and annular shoulder I near its bottom, removable water-tank D, having flange E and central bottom screw, F, removable bottom G, having the central aperture, J, nut H, removable faucet-tube L, connecting tank D with the faucet in the outer shell, washers M and N, and removable nut K, all constructed and combined substantially as and for the purpose shown and set forth.

In testimony that I claim the foregoing as my own I have hereunto affixed my signature in presence of two witnesses.

JOHN EDWARD WELLING.

Witnesses:
 WILLIAM T. SHEPARD,
 WM. G. JESSE.